United States Patent Office 2,694,009
Patented Nov. 9, 1954

2,694,009

DIAZO-N-SULFONATE LIGHT-SENSITIVE MATERIAL

Oskar Süs, Wiesbaden-Biebrich, Germany, assignor, by mesne assignments, to Keuffel & Esser Co., Hoboken, N. J., a corporation of New Jersey No Drawing. Application August 12, 1949, Serial No. 110,025

Claims priority, application Germany October 1, 1948

13 Claims. (Cl. 95—6)

The present invention relates to the production of diazotype light-sensitive layers, wherein the light-sensitive agent is an aromatic diazo-N-sulfonate. More particularly it relates to the improvement of both the photo-sensibility and the stability of light-sensitive layers containing aromatic diazo-N-sulfonates as sensitizing agents.

In the U. S. patent specification No. 2,217,189 a process of making photoprints has been described which renders it possible to produce positive copies by only subjecting to the influence of heat light-sensitive diazotype layers having been exposed to light under an original application of alkaline media being perfectly excluded. In this process aromatic diazo-N-sulfonates are used as photoactive agents in the light-sensitive layer. It has been indicated, that those aromatic diazo-N-sulfonates should be preferred which are ortho-substituted with respect to the photo-active group by alkylhydroxy groups.

Light-sensitive materials which have been prepared according to the process described in U. S. Patent No. 2,217,189 have the disadvantage in comparison to standard diazo-type papers to be less stable when being stored in unexposed state and to have an insufficient photosensitivity. For this reason this type of diazo-type materials could not yet be introduced for practical use.

In U. S. Patent 2,429,249 the proposition has been made to use the addition products formed by reaction of sulfurous acid salts with organic carbonyl compounds for stabilization purposes in layers containing certain aromatic diazo-N-sulfonates. The stabilization of the layers is actually improved, but at the same time their photo-sensitivity is made worse, though as to this property the diazo-sulfonate layers did not correspond with the requirements of the practice.

It is the object of the present invention to improve the light-sensitive layers containing aromatic diazo-N-sulfonates in such a degree, that they can be used in positive photo-printing. This improvement is effected according to the invention by adding water-soluble salts of certain aromatic sulfonic acids to the light-sensitive layer and the coating solution respectively, which is applied to a suitable carrier to form the light-sensitive layer. The presence of water-soluble salts of certain aromatic sulfonic acids increases remarkably the storing stability of the sensitive layers and at the same time their photo-sensitivity.

The present invention is concerned with the improvement of such light-sensitive layers, which have been prepared while using as light-sensitive substances the aromatic diazo-N-sulfonates of N,N-dialkyl-p-phenylendiamines which are substituted in at least one of the ortho-positions to the diazo group by alkyl and alkoxy groups, such as methoxy and ethoxy, respectively.

The easily water-soluble salts of the aromatic sulfonic acids are advantageously used, f. i. their sodium salts, because said salts do scarcely influence the pH-value of the layers. The salts of aromatic sulfonic acids of the benzene and naphthalene series, which are substituted by halogen or alkyl or alkoxy groups in para-position to the sulfonic acid group are distinguished by an evident superiority.

The fact must be mentioned, that among sulfonic acids to be used according to the present invention members are to be found which favorably influence the shade of the prints thus rendering it possible to produce images showing dark blue lines.

The aromatic sulfonic acids to be added to the light-sensitive layers according to the present invention can also be used in combination with the stabilizing agents described in U. S. Patent 2,429,249. In this case an additional improvement of the stability of the layers surprisingly occurs and at the same time the above mentioned deterioration of the photo-sensitivity due to the bisulfite-addition compound is compensated.

The present invention makes new diazotype photoprinting papers available which make unnecessary the application of alkaline agents, such as ammonia, and which fulfill the requirements of practice as to storing stability and photo-sensitivity, provided that powerful light sources, e. g. a carbon arc lamp, are used.

The following examples are inserted in order to illustrate the present invention, but they are not intended to limit the scope thereof in any way. Unless otherwise indicated the parts are by weight.

(1) 1 g. of the sulfonate of the diazo compound of 1-diethylamino-3-ethoxy-4-aminobenzene are dissolved in 25 ccm. of water and 0.2 g. of anhydrous sodium sulfite and 0.5 g. of zinc acetate are added. The solution is mixed with an aqueous solution of 0.4 g. of phloroglucinol, 1.5 g. of thiourea and 1.5 g. of the sodium salt of 1-methoxynaphthalene-4-sulfonic acid in 25 ccm. of water, after this solution has cooled down. Paper is coated on one side with the above described mixture in known manner. The addition of the 1-methoxynaphthalene-4-sulfonic acid salt causes a 30% improvement of the photo-sensitivity. The prints are developed in known manner in an apparatus provided with a heating cylinder. Instead of 1-methoxynaphthalene-4-sulfonic acid the sodium salts of the following sulfonic acids can be used in the above described mixture:

1-ethoxynaphthalene-4-sulfonic acid
1-chloronaphthalene-4-sulfonic acid

As representatives of the benzene series which have proved to be suited for the present invention the following compounds are to be named 1-ethoxybenzene-4-sulfonic acid
1,3-dimethylbenzene-4-sulfonic acid which can be used in the form of their sodium salts. The better the solubility in water of the sulfonic acid salts is, the larger quantities of them can be added to the sensitizing coating solution. This circumstance is important, because the photosensitivity of the layer bears a direct relationship to the concentration of the sulfonic acid salts.

(2) As has been described in Example 1, a paper sheet being suited for the production of photoprinting material is coated with a solution containing—

1 g. of the sulfonate of the diazo compound of 1-diethylamino-3-ethoxy-4-aminobenzene
0.5 g. of zinc acetate
0.4 g. of phloroglucinol
1.5 g. of thiourea
1.5 g. of the sodium salt of 1-methoxynaphthalene-4-sulfonic acid and
1.5 g. of sodium salicylate The addition of sodium salicylate leads to changing the shade of the prints to blue.

(3) 1 g. of the sulfonate of the diazo compound of 1-diethylamino-3.5-diethoxy-4-aminobenzene are dissolved in water together with—

2.5 g. of sodium sulfite
0.5 g. of zinc acetate
0.4 g. of phloroglucinol
1.5 g. of thiourea
1.5 g. of the sodium salt of 1-methoxynaphthalene-4-sulfonic acid and
1.5 g. of the bisulfite compound of isobutaldehyde Papers which have been photo-sensitized with the before mentioned solution are distinguished by an outstanding stability and afford prints with dark blue lines.

After having particularly disclosed and described the present invention, what I claim is:

1. A positive working heat developable light sensitive diazotype material comprising a base and a light sensitive layer coated thereon, said light sensitive layer comprising an aromatic diazo-N-sulfonate of an N,N-dialkyl-p-phenylene diamine which is substituted in at least one of the ortho positions to the diazo group by a group selected from alkyl and alkoxy groups, an azo coupling component of great coupling energy and in addition a water soluble salt of an aromatic sulfonic acid of the benzene and naphthalene series which has a sulfonic group attached directly to an aromatic ring which is substituted in para-position to the sulfonic acid group by a substituent selected from the group consisting of halogen, alkyl and alkoxy groups.

2. A positive working heat developable light sensitive diazotype material comprising a base and a light sensitive layer coated thereon, said light sensitive layer comprising an aromatic diazo-N-sulfonate of an N,N-dialkyl-p-phenylene diamine which is substituted in at least one of the ortho positions to the diazo group by a group selected from alkyl and alkoxy groups, an azo coupling component of great coupling energy, in addition a water soluble salt of an aromatic sulfonic acid of the benzene and naphthalene series which has a sulfonic group attached directly to an aromatic ring which is substituted in para-position to the sulfonic acid group by a substituent selected from the group consisting of halogen, alkyl and alkoxy groups and an aldehyde-bisulfite-addition compound.

3. A positive working heat developable light sensitive diazotype material comprising a base and a light sensitive layer coated thereon, said light sensitive layer comprising an aromatic diazo-N-sulfonate of an N,N-dialkyl-p-phenylene diamine which is substituted in at least one of the ortho positions to the diazo group by a group selected from alkyl and alkoxy groups, an azo coupling component of great coupling energy and in addition the sodium salt of 1-methoxynaphthalene-4-sulfonic acid.

4. A positive working heat developable light sensitive diazotype material comprising a base and a light sensitive layer coated thereon, said light sensitive layer comprising an aromatic diazo-N-sulfonate of an N,N-dialkyl-p-phenylene diamine which is substituted in at least one of the ortho positions to the diazo group by a group selected from alkyl and alkoxy groups, an azo coupling component of great coupling energy and in addition the sodium salt of 1-chloronaphthalene-4-sulfonic acid.

5. A positive working heat developable light sensitive diazotype material comprising a base and a light sensitive layer coated thereon, said light sensitive layer comprising an aromatic diazo-N-sulfonate of an N,N-dialkyl-p-phenylene diamine which is substituted in at least one of the ortho positions to the diazo group by a group selected from alkyl and alkoxy groups, an azo coupling component of great coupling energy and in addition the sodium salt of 1-methyl-3-hydroxy-benzene-6-sulfonic acid.

6. A positive working heat developable light sensitive diazotype material comprising a base and a light sensitive layer coated thereon, said light sensitive layer comprising an aromatic diazo-N-sulfonate of an N,N-dialkyl-p-phenylene diamine which is substituted in at least one of the ortho positions to the diazo group by a group selected from alkyl and alkoxy groups, an azo coupling component of great coupling energy and in addition the sodium salt of 1,3-dimethyl-benzene-4-sulfonic acid.

7. A positive working light sensitive diazotype material comprising a base and a light sensitive layer coated thereon, said light sensitive layer comprising the diazo-N-sulfonate of 1-diethylamino-3-ethoxy-4-aminobenzene, an azo coupling component of great coupling energy and in addition the sodium salt of 1-methoxy-naphthalene-4-sulfonic acid for increasing the stability of said light sensitive layer during storage.

8. A positive working light sensitive diazotype material comprising a base and a light sensitive layer coated thereon, said light sensitive layer comprising the diazo-N-sulfonate of 1-diethylamino-3-ethoxy-4-amino benzene, an azo coupling component of great coupling energy and in addition the sodium salts of 1-methoxynaphthalene-4-sulfonic acid and salicylic acid for increasing the stability of said light sensitive layer during storage.

9. A positive working heat developable light-sensitive diazotype material comprising a base and a light-sensitive layer coated thereon, said light-sensitive layer comprising an aromatic diazo-N-sulfonate of an N,N-dialkyl-p-phenylene diamine which is substituted in at least one of the ortho positions to the diazo group by an alkyl group, an azo coupling component of high coupling energy and in addition a water soluble salt of an aromatic sulfonic acid of the benzene and naphthalene series which has a sulfonic group attached directly to an aromatic ring and an alkoxy group in p-position to the sulfonic group.

10. A positive working heat developable light-sensitive diazotype material comprising a base and a light-sensitive layer coated thereon, said light-sensitive layer comprising an aromatic diazo-N-sulfonate of an N,N-dialkyl-p-phenylene diamine which is substituted in at least one of the ortho positions to the diazo group by an alkoxy group, an azo coupling component of high coupling energy and in addition a water soluble salt of an aromatic sulfonic acid of the benzene and naphthalene series which has a sulfonic group attached directly to an aromatic ring and an alkoxy group in p-position to the sulfonic group.

11. A positive working heat developable light-sensitive diazotype material comprising a base and a light-sensitive layer coated thereon, said light-sensitive layer comprising an aromatic diazo-N-sulfonate of a N,N-dialkyl-p-phenylene diamine which is substituted in at least one of the ortho positions to the diazo group by a group selected from alkyl and alkoxy groups, an azo coupling component of high coupling energy and in addition a water soluble salt of 1-alkoxy-naphthalene-4-sulfonic acid.

12. A positive working heat developable light-sensitive diazotype material comprising a base and a light-sensitive layer coated thereon, said light-sensitive layer comprising an aromatic diazo-N-sulfonate of a N,N-dialkyl-p-phenylene diamine which is substituted in at least one of the ortho positions to the diazo group by a group selected from alkyl and alkoxy groups, an azo component of high coupling energy and in addition a water soluble salt of 1-ethoxy-naphthalene-4-sulfonic acid.

13. A positive working heat developable light-sensitive diazotype material comprising a base and a light-sensitive layer coated thereon, said light-sensitive layer comprising an aromatic diazo-N-sulfonate of a N,N-dialkyl-p-phenylene diamine which is substituted in at least one of the ortho positions to the diazo group by a group selected from alkyl and alkoxy groups, an azo coupling component of high coupling energy, in addition a water soluble salt of 1-alkoxy-naphthalene-4-sulfonic acid and an additional product formed by the reaction of sulfurous acid salts with an organic carbonyl compound.

References Cited in the file of this patent

UNITED STATES PATENTS

| Number | Name | Date |
|---|---|---|
| 1,973,148 | Kemmerich | Sept. 11, 1934 |
| 2,217,189 | Suss | Oct. 8, 1940 |
| 2,246,425 | Von Poser | June 17, 1941 |
| 2,416,773 | Reichel | Mar. 4, 1947 |
| 2,429,249 | Von Glahn et al. | Oct. 21, 1947 |
| 2,432,593 | Straley | Dec. 16, 1947 |
| 2,487,034 | Von Glahn et al. | Nov. 1, 1949 |
| 2,494,906 | Slifkin et al. | Jan. 17, 1950 |
| 2,545,057 | Von Glahn | Mar. 13, 1951 |